(12) United States Patent
Watanabe

(10) Patent No.: US 6,269,224 B1
(45) Date of Patent: *Jul. 31, 2001

(54) FILM POSITION DETERMINING DEVICE

(75) Inventor: Hajime Watanabe, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/571,461

(22) Filed: Dec. 13, 1995

(30) Foreign Application Priority Data

Dec. 21, 1994 (JP) .................................. 6-318117

(51) Int. Cl.$^7$ ........................................ G03B 1/00
(52) U.S. Cl. ............................................ 396/409
(58) Field of Search ........................ 354/213, 217, 354/218; 396/395, 397, 398, 406, 409; 348/102, 105; 355/40

(56) References Cited

U.S. PATENT DOCUMENTS

| 762,035 | * | 6/1904 | Folmer ................................. 354/183 |
| 981,064 | * | 1/1911 | Cole ..................................... 354/105 |
| 3,724,348 | * | 4/1973 | Monks ................................. 354/212 |
| 4,133,005 | * | 1/1979 | Golay et al. ......................... 358/132 |
| 4,195,920 | * | 4/1980 | Russell et al. ........................ 353/26 |
| 4,711,545 | * | 12/1987 | Crema ................................. 354/213 |
| 4,720,721 | * | 1/1988 | Hamada et al. .................. 354/173.1 |
| 4,903,060 | * | 2/1990 | Hoshino et al. .................. 354/173.1 |
| 4,996,549 | * | 2/1991 | Yamaguchi ..................... 354/173.11 |
| 5,300,975 | * | 4/1994 | Kunshige ....................... 354/173.11 |
| 5,345,286 | * | 9/1994 | Stiehler ............................ 354/173.1 |
| 5,489,957 | * | 2/1996 | Weaver .......................... 354/173.11 |
| 5,493,330 | * | 2/1996 | Tomura et al. ...................... 348/102 |
| 5,508,767 | * | 4/1996 | Kazumi et al. ...................... 354/106 |
| 5,532,775 | * | 7/1996 | Soshi et al. .......................... 354/106 |
| 5,721,975 | * | 2/1998 | Sato et al. ............................. 396/89 |

* cited by examiner

Primary Examiner—Christopher E. Mahoney
(74) Attorney, Agent, or Firm—Robin, Blecker & Daley

(57) ABSTRACT

A device for determining a position of a film which has been stopped includes plural mutually spaced film characteristic sensors. The sensors are disposed along a film transport path and circuitry associated with the sensors provides output indication that the film is in a predetermined position responsively to inputs from the film characteristic sensors.

14 Claims, 6 Drawing Sheets

FILM POSITION DETERMINING DEVICE

BACKGROUND OF THE INVENTION

1. Field of the Invention

This invention relates to a device for determining the position of a film loaded on a camera or the like.

2. Description of the Related Art

Since, in a conventional camera, the positional relation of perforations provided in a film to a photographing picture frame is not always fixed, a film position detecting device has been configured to detect the relative positions of the perforations and the photographing picture frame when the film is being transported.

Meanwhile, there has been proposed a camera arranged to use a film in which only one perforation is assigned to each photographing picture frame and the absolute positional relation between the perforation and the photographing picture frame is fixed. The camera of this kind is arranged to mechanically fix the position of the perforation so as to hold the film in position.

However, the conventional camera first cited above has presented a problem in that, when the film happens to deviate from its predetermined position due to vibrations or a fall of the camera, the film position detecting device of the camera fails to detect the deviation of the film. In such a case, pictures taken might partly overlap each other.

In the case of the camera secondly cited above, the camera is provided with a member for fixing the position of the film perforation. The use of the fixing member not only prevents reduction in cost and size of the camera but also tends to impair the flatness of the film.

SUMMARY OF THE INVENTION

In accordance with one aspect of this invention, there is provided an apparatus comprising a determination device for determining a position of a film which has been stopped, which is advantageous in terms of reduction in cost and size as the apparatus is arranged in a simple manner to be capable of adequately preventing pictures from overlapping each other due to a positional deviation of the film caused by a fall or vibrations of the apparatus.

The above and other aspects of this invention will become apparent from the following detailed description of embodiments thereof taken in connection with the accompanying drawings.

DETAILED DESCRIPTION OF THE PREFERRED EMBODIMENTS

The following describes by way of example some of preferred embodiments of this invention with reference to the drawings.

Figure 1:
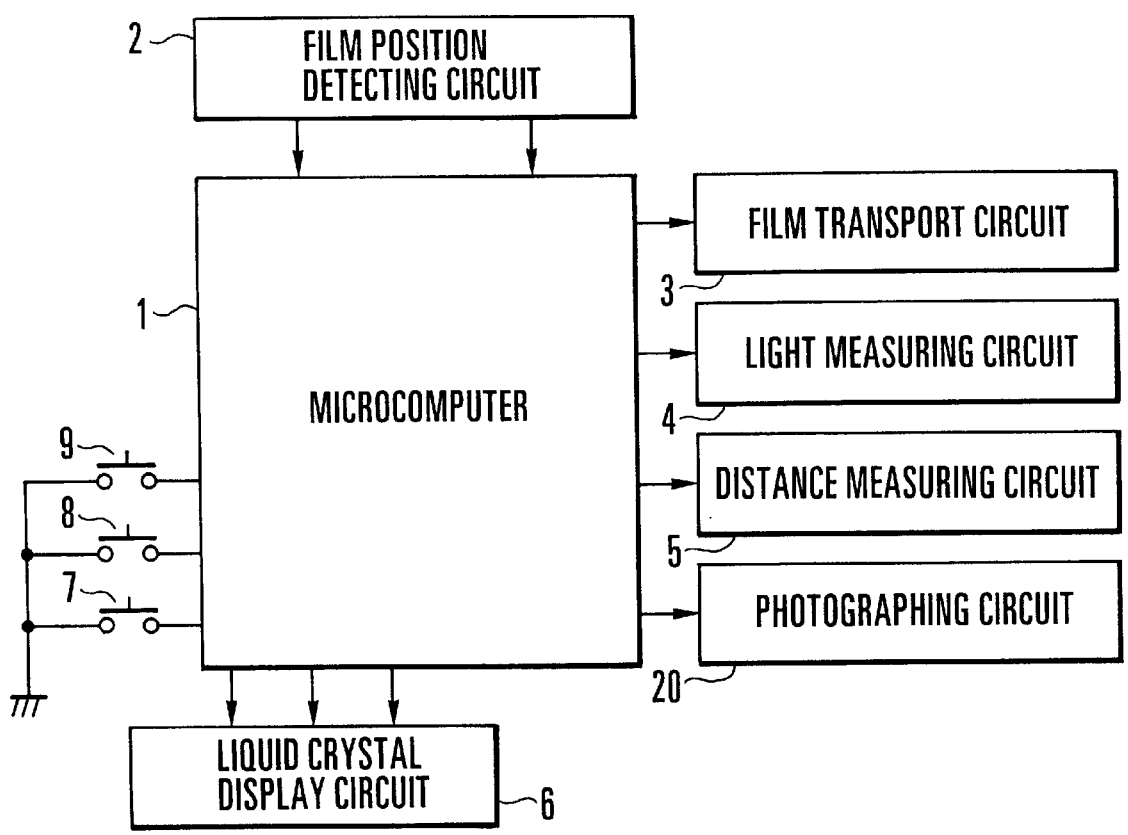
FIG. 1 is a block diagram showing the circuit arrangement of a camera according to embodiments of this invention.

FIG. 1 is a block diagram of the circuit arrangement of a camera according to embodiments of this invention. Referring to FIG. 1, a microcomputer 1 is arranged to control the various actions of the camera. A film position detecting circuit 2 is arranged to detect the position of a film in use. A film transport circuit 3 is arranged to wind and rewind the film. A light measuring circuit 4 is arranged to measure the luminance of an object to be photographed. A distance measuring circuit 5 is arranged to measure a distance to the object. A photographing circuit 20 is arranged to perform a photographing action. A liquid crystal display circuit 6 is arranged to display information of varied kinds about the camera. A switch (SW1) 7 is arranged to turn on when a shutter release button is pushed halfway. A switch (SW2) 8 is arranged to turn on when the release button is pushed to the end of its full stroke to initiate an exposure action. A mode selection switch 9 is provided for switching the photographing mode of the camera from one mode to another.

Figure 2:
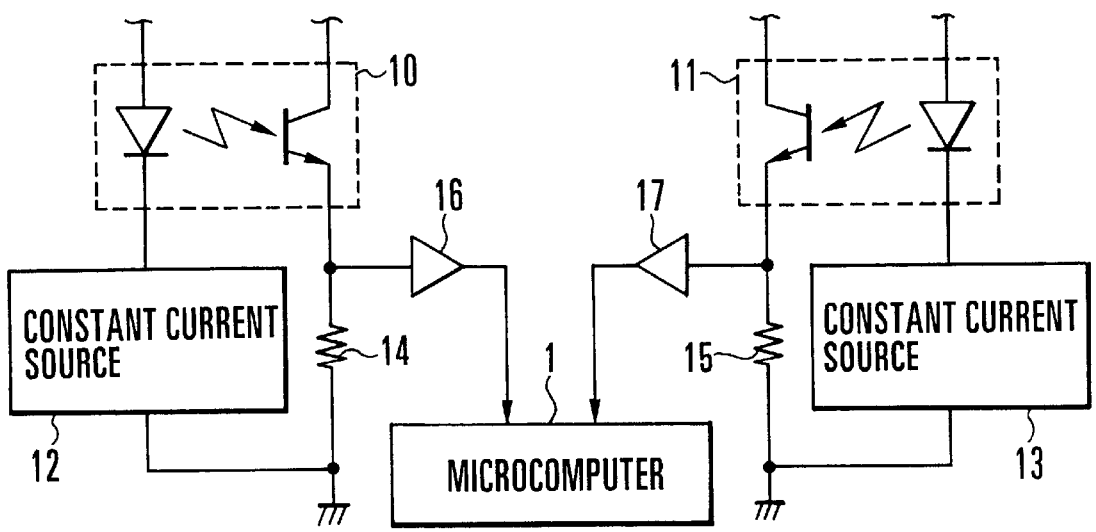
FIG. 2 is a circuit diagram showing the details of the concrete arrangement of a film position detecting circuit shown in FIG. 1.

FIG. 2 shows the details of the concrete arrangement of the film position detecting circuit 2. Referring to FIG. 2, each of two photo-reflectors 10 and 11 is a photo-sensor arranged to detect the presence or absence of each perforation provided in the film. Hereinafter, the photo-reflectors 10 and 11 will be referred to respectively as PR1 and PR2. Each of constant current circuits 12 and 13 is arranged to cause a current of a predetermined value to flow to the PR1 or PR2. Resistors 14 and 15 are arranged to respectively convert the outputs of the PR1 and PR2 into voltages. The resistors 14 and 15 are set respectively at predetermined resistance values. Comparators 16 and 17 are arranged to respectively compare the outputs of the PR1 and PR2 with predetermined reference values. In the embodiments, the comparator 16 or 17 provides a low level output when the PR1 or PR2 faces uperferated surface of the film and provides a high level output when the PR1 or PR2 faces each perforation of the film.

The film transport circuit 3 is arranged to be controlled on the basis of the output of the film position detecting circuit 2. Further, the constant current circuits 12 and 13, the resistors 14 and 15 and the comparators 16 and 17 may be incorporated into the microcomputer 1 in one chip.

Figure 3:
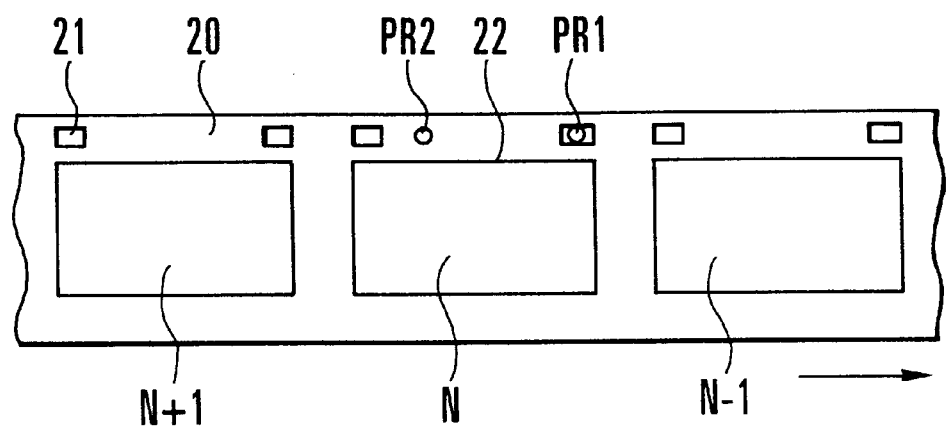
FIG. 3 shows the positional relation between photo-reflectors and a film.

FIG. 3 shows the positional relation between the film used in the embodiments and the PR1 and PR2 obtained when the film is stopped in an apposite predetermined photographing position. The illustration includes the film 20, the perforations 21 provided in the film 20, and a photographing picture frame 22 which is at an N-th frame. An (N-1)th frame is a picture frame which has already been used for photographing. In the case of FIG. 3, the film 20 is assumed to be wound up to the right as viewed on the drawing (in the direction of the arrow).

As shown in FIG. 3, when the film is in the apposite predetermined photographing position, the PR1 is just on a perforation of the film, while the PR2 is located on uperferated surface of the film.

Figure 4:
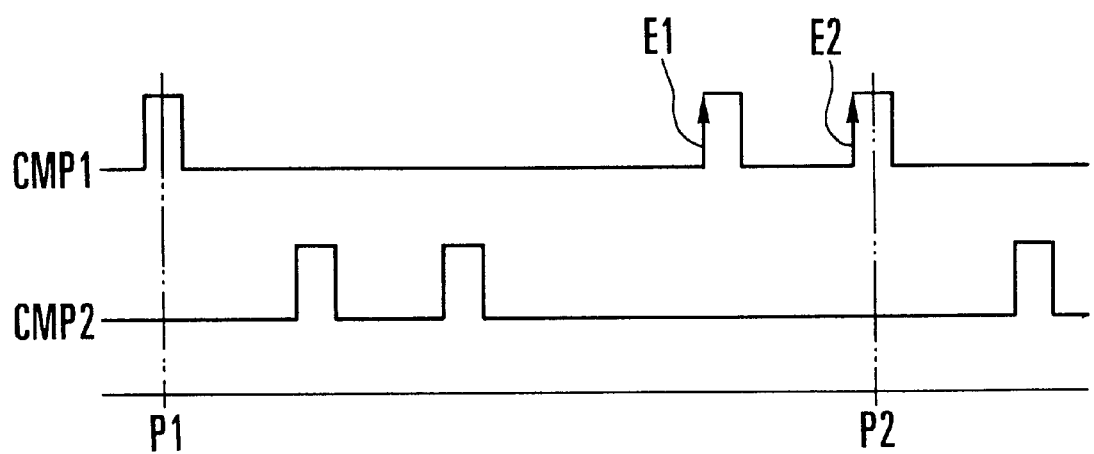
FIG. 4 is a timing chart showing the outputs of the film position detecting circuit shown in FIG. 1.

FIG. 4 is a timing chart showing an output CMP1 of the comparator 16 and an output CMP2 of the comparator 17 which are obtained when the film is being wound up.

Referring to FIG. 4, the outputs of the comparators 16 and 17 obtained when the film is in the apposite predetermined photographing position as shown in FIG. 3 are indicated at a position P1 where the output CMP1 is at a high level and the output CMP2 is at a low level. When the film is normally wound up for one frame to come to an (N+1)th frame, the outputs of the comparators 16 and 17 come to another position P2. Completion of winding for one frame is determined by detecting the rises E1 and E2 to the high level of the output CMP1 taking place in succession while the output CMP2 is at a low level.

With the camera arranged as described above, the camera operates as described below with reference to FIG. 5 which is a flow chart of the operation of the microcomputer 1.

At a step S1, a check is made for the state of the switch SW1. When the switch SW1 turns on, the flow of operation comes to a step S2. At the step S2, the microcomputer 1 causes the light measuring circuit 4 to measure the luminance of an object to be photographed. At a step S3, the distance measuring circuit 5 is caused to measure a distance to the object. At a step S4, a check is made for the state of the switch SW2. When the switch SW2 turns on, the flow comes to a step S5. At the step S5, the film position detecting circuit 2 is caused to begin to detect the position of the film.

At a step S6, a check is made to find if the film is stopped in an apposite predetermined photographing position. If the film is found to be in the predetermined photographing position as shown in FIG. 3, the flow proceeds to a step S7. At the step S7, since the film is in the predetermined photographing position, the photographing circuit 20 is allowed to perform photographing actions in a normal sequence of the camera. If the film is found to be not in the predetermined photographing position, the flow comes to a step S8. At the step S8, the photographing circuit 20 is inhibited from performing the photographing actions and the shutter release switch is locked.

Figure 5:
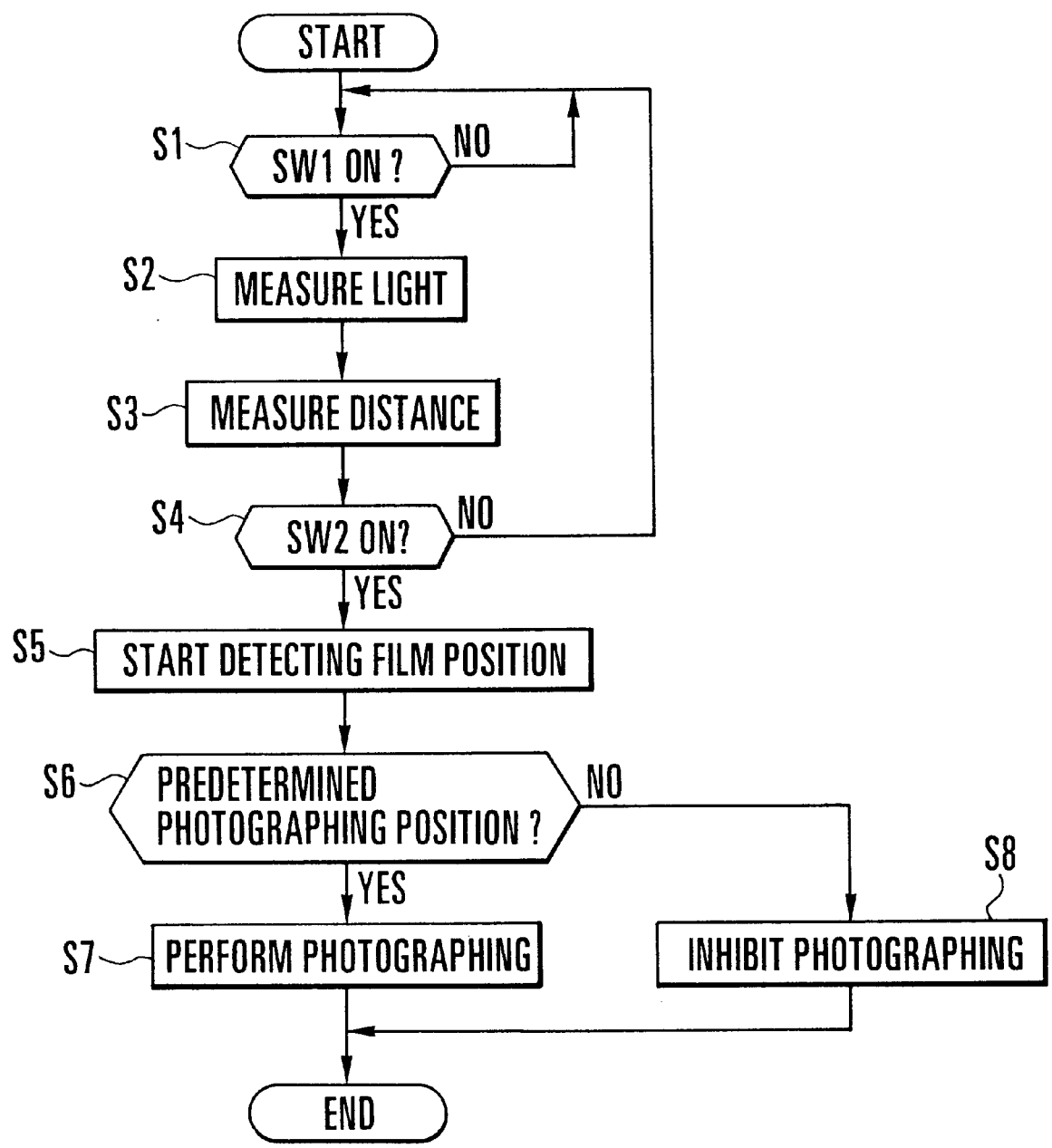
FIG. 5 is a flow chart showing the operation of a microcomputer of FIG. 1 according to a first embodiment of this invention.

While it is not shown in the flow chart of FIG. 5, the camera may be arranged to cause the liquid crystal display circuit 6 or the like to provide a warning display at the same time that the photographing action is inhibited at the step S8, if the film is found to be not in the predetermined photographing position.

The first embodiment is arranged, as described above, to confirm, during photographing, the position of the film by using the film position detecting circuit 2 and, if the film is found to have deviated from the predetermined photographing position due to vibrations or a fall of the camera, to inhibit photographing, so that photographing picture frames can be prevented from overlapping each other. In such a case, the arrangement of causing a liquid crystal display or the like to give a warning display would visually inform the photographer that a photographing operation is inhibited.

Figure 6:
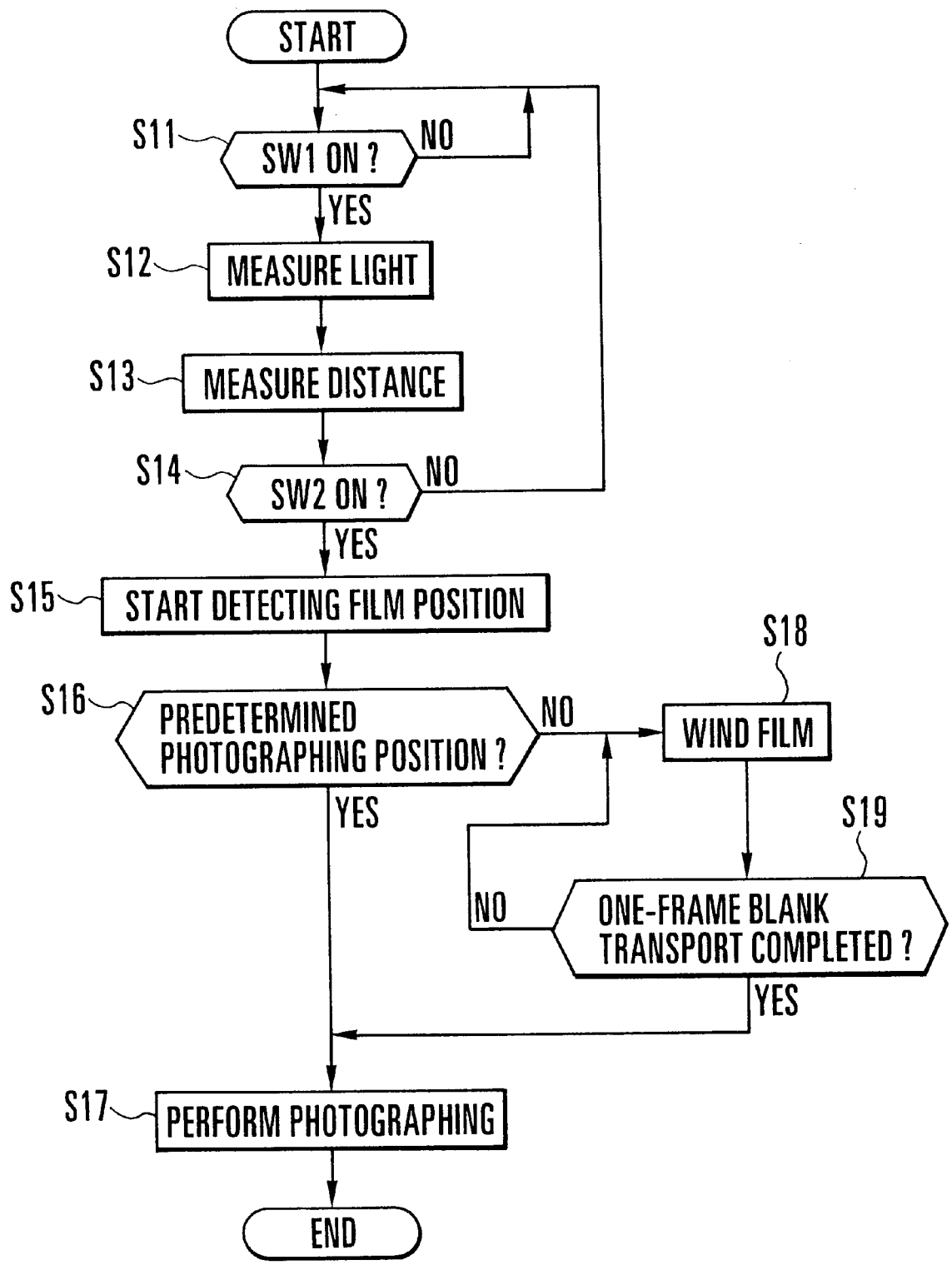
FIG. 6 is a flow chart showing the operation of the microcomputer of FIG. 1 according to a second embodiment of this invention.
Figure 7A:
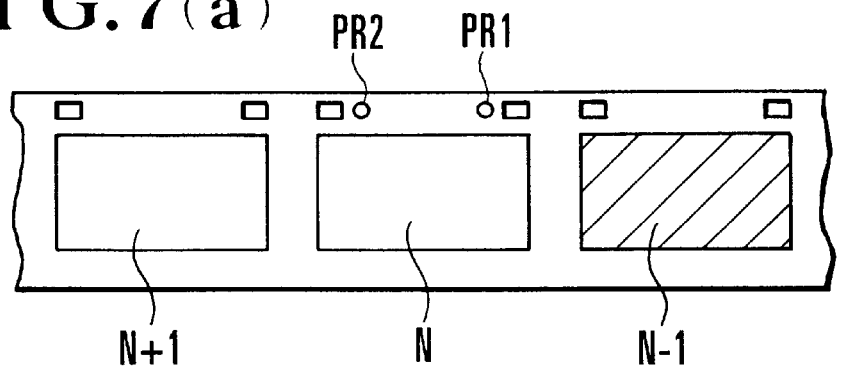
FIGS. 7(a) and 7(b) are diagrams explaining cases where a film is not in a predetermined photographing position in the second embodiment of this invention.
Figure 7B:
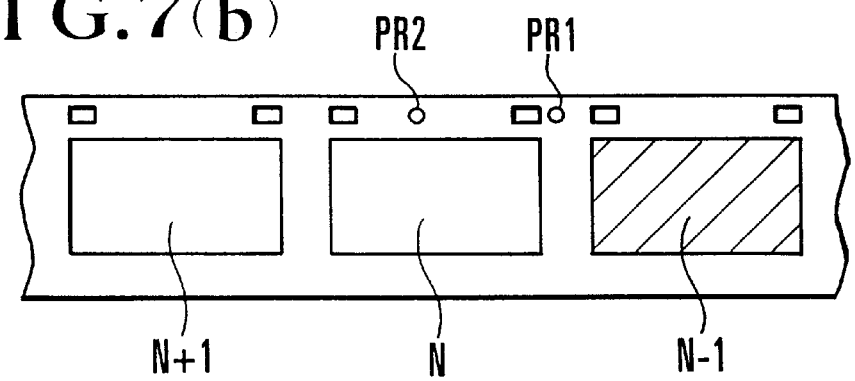

FIG. 6 is a flow chart showing the operation of a microcomputer 1 according to a second embodiment of this invention. FIGS. 7(a) and 7(b) show the positional relation between the PR1 and PR2 and the film when the position of the film has deviated in the film winding direction and in the film rewinding direction, respectively.

Figure 8:
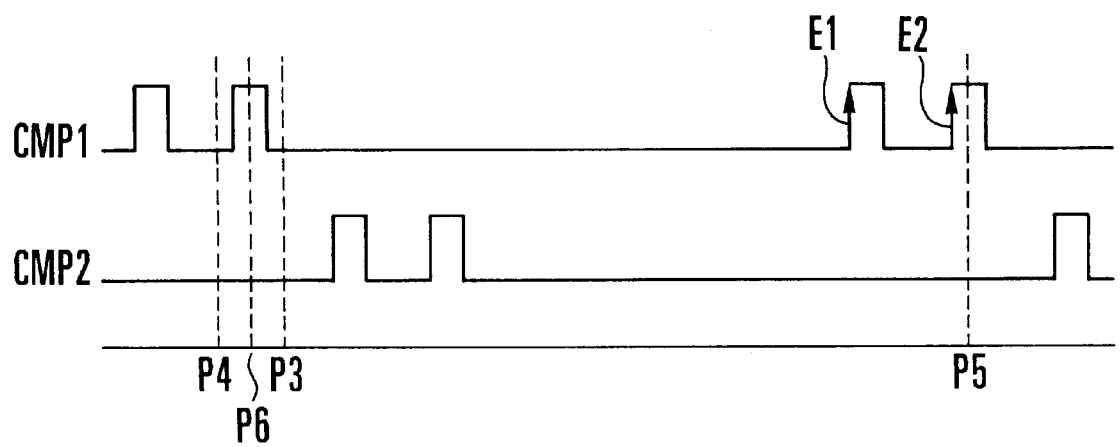
FIG. 8 is a timing chart showing the outputs of the film position detecting circuit of FIG. 1 in the second embodiment of this invention.

FIG. 8 is a timing chart showing the respective outputs CMP1 and CMP2 of the comparators 16 and 17. In FIG. 8, reference symbols P3 and P4 indicate the states of the outputs CMP1 and CMP2 of the comparators 16 and 17 which are obtained in the events of FIGS. 7(a) and 7(b), respectively.

The illustrations given in FIGS. 1, 2 and 3 apply as they are to the arrangement of the second embodiment.

Referring to the flow chart of FIG. 6, the operation of the second embodiment of this invention is described as follows:

At a step S11, a check is made for the state of the switch SW1. If the switch SW1 is found to have turned on, the flow comes to a step S12. At the step S12, the microcomputer 1 causes the light measuring circuit 4 to measure the luminance of an object to be photographed. At a step S13, the distance measuring circuit 5 is caused to measure a distance to the object.

At a step S14, a check is made to find if the switch SW2 has turned on. If so, the flow comes to a step S15. At the step S15, the film position detecting circuit 2 is caused to begin to detect the position of the film. At a step S16, a check is made to find if the film is stopped in an apposite predetermined photographing position. If the film is found to be in the predetermined photographing position as shown in FIG. 3, the flow proceeds to a step S17.

At the step S17, since the film is in the predetermined photographing position, the photographing circuit 20 is caused to perform photographing actions in the normal sequence of the camera. If the film is found at the step S16 to be not in the predetermined photographing position and to be in a position as shown in FIG. 7(a) or 7(b), the flow comes to a step S18. At the step S18, since the film is found to be not in the predetermined photographing position, the film transport circuit 3 is caused to perform a film winding action and the flow comes to a step S19.

At the step S19, a check is made for completion of one-frame blank transport of the film, by causing the film position detecting circuit 2 to detect the rises E1 and E2 of the output CMP1 which take place in succession as shown in FIG. 8. The flow then comes to the step S17 to cause the photographing circuit 20 to perform photographing actions. At this time, a photographing frame of the film shifts to the (N+1)th frame and the outputs CMP1 and CMP2 of the comparators 16 and 17 come into the state shown at a point P5 in FIG. 8.

In the second embodiment described above, the position of the film is confirmed by means of the film position detecting circuit 2 during photographing. In a case where the film is thus found to have deviated from a predetermined photographing position due to vibrations or a fall of the camera, the film is subjected to one-frame blank transport. Although, in such a case, the one-frame blank transport of the film may cause an N-th frame portion of the film to be left unused for photographing, the possibility of having overlapped picture planes is effectively eliminated.

Figure 9:
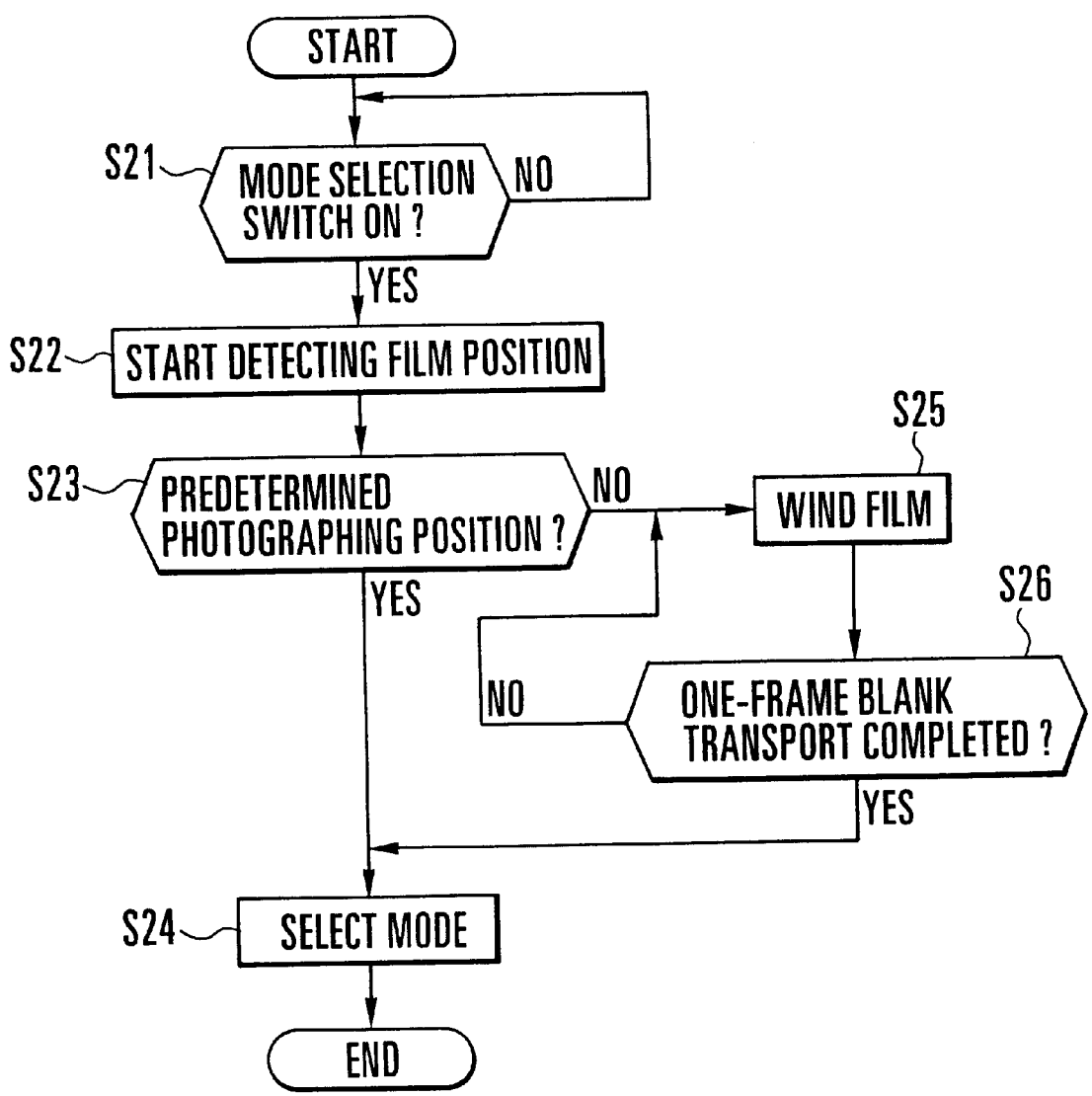
FIG. 9 is a flow chart showing the operation of the microcomputer of FIG. 1 according to a third embodiment of this invention.

FIG. 9 is a flow chart showing the operation of the microcomputer 1 according to a third embodiment of this invention. The illustrations given in FIGS. 1, 2 and 3 apply as they are to the arrangement of the third embodiment.

Referring to FIG. 9, a check is made for the state of a mode selection switch 9, which may be arranged in any known manner as desired. If the mode selection switch 9 is found to be in an on-state, the flow comes to a step S22. At the step S22, the film position detecting circuit 2 is caused to begin to detect the position of the film. At a step S23, a check is made to find if the film is stopped in an apposite predetermined photographing position. If the film is found to be in the predetermined photographing position as shown in FIG. 3, the flow comes to a step S24. At the step S24, since the film is in the predetermined photographing position, the photographing mode of the camera is shifted to a mode selected by the mode selection switch 9.

If the film is found at the step S23 to be not in the predetermined photographing position, the flow comes to a step S25. At the step S25, since the film is not in the predetermined photographing position, the film transport circuit 3 is caused to perform a film winding action. The flow then comes to a step S26. At the step S26, a check is made by the film position detecting circuit 2 to find if the one-frame blank transport of the film has been completed. Upon completion of the one-frame blank transport, the flow comes to the step S24 to select the photographing mode of the camera by the mode selection switch 9.

The third embodiment is arranged to cause the film position detecting circuit 2 to confirm the position of the film when some of switches of the camera are pushed. In a case where the film is found to have deviated from the predetermined photographing position due to vibrations or a fall of the camera or the like, the film is subjected to the one-frame blank transport. Therefore, in such a case, although an N-th frame may be left unused for photographing, photographing picture planes of the film can be prevented from overlapping each other. Further, the arrangement of making a check for the position of the film every time a switch is operated minimizes the probability of having the film deviating from the predetermined photographing position when the switch SW2 is pushed for photographing. Therefore, the probability of performing the one-frame blank transport of the film when the switch SW2 is pushed is very small, so that shutter opportunities are seldom missed.

The second and third embodiments described above are arranged to control the position of the film by performing the one-frame blank transport if the film is not stopped in an apposite predetermined photographing position. However, since the film does not much deviate in general, the arrangement may be changed to include some control means that is arranged to cause the film to be wound or rewound only to a very short extent to bring the film back to the predetermined photographing position (a point P6 shown in FIG. 8), when the film is found by the film position detecting circuit 2 to have deviated from the predetermined photographing position (for example, at the point P3 or P4 shown in FIG. 8). Such a modification effectively prevents overlapping of photographing picture frames without causing any frame to be left unused for photographing, like in the cases of the second and third embodiments, because the N-th frame can be used for photographing by virtue of the control action of the control means.

Each of the embodiments described above detects the position of the film by using two photo-reflectors. However, in accordance with this invention, this detecting method may be replaced by any other suitable method.

Further, the embodiments described above are arranged to make a check for the position of the film at the commencement of an exposure action with the shutter release button fully pushed to the end of its stroke. The arrangement may be changed to make this check at any stage of the pushing operation on the shutter release button, such as when the shutter release button is pushed halfway or when it is pushed halfway and then fully pushed.

The embodiments described above are arranged to detect the position of a perforation of the film by means of the photo-reflectors. However, this detecting method may be replaced by some other suitable method. For example, a pulse disk or the like may be used in place of the photo-reflectors. Further, this invention applies also to image recording media other than films.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

This invention may be carried out by combining as necessary the embodiments or their technological elements described in the foregoing.

This invention applies to cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements forming these apparatuses and devices.

What is claimed is:

1. An apparatus comprising:
   a) a film transport device which transports a film;
   b) a position detection device which detects a position of the film transported by the film transport device;
   c) a determination device which determines whether the film frame is at a photo-taking position or is deviated from the photo-taking position under a stopped condition of the film; and
   d) a control device which controls said film transport device to perform a predetermined operation when said position of the film frame is determined to be not positioned at the photo-taking position by said determination device.

2. An apparatus according to claim 1, wherein said apparatus includes a camera.

3. An apparatus according to claim 1, wherein said determination device includes a device for determining a position of a perforation provided in the film.

4. An apparatus according to claim 1, wherein said determination device includes a device for optically detecting a position of a perforation provided in the film.

5. An apparatus according to claim 1, wherein said determination device includes means for acting in response to an operation of a shutter release member.

6. An apparatus according to claim 1, wherein said determination device includes means for acting in association with an operation for causing said apparatus to perform the predetermined operation.

7. An apparatus according to claim 1, wherein said control device controls said film transport device to transport said film to a next frame when said position of the film frame is determined to be not positioned at the photo-taking position by the determination device.

8. An apparatus according to claim 1, wherein said control device controls said film transport device to wind or rewind the film so as to correct said position of the film frame to photo-taking position when said position of the film is determined to be not at the photo-taking position by the determination device.

9. An apparatus according to claim 1, wherein said determination device includes means for restraining a photographing operation if the film is not in the photo-taking position in accordance with the result of said determining.

10. An apparatus according to claim 1, wherein said determination device includes means for inhibiting a photographing operation if the film is not in the photo-taking position in accordance with the result of said determining.

11. An apparatus according to claim 1, wherein said determination device includes means for giving information in respect of the position of the film, if the film is not in the photo-taking position in accordance with the result of said determining.

12. An apparatus according to claim 1, wherein said apparatus is arranged to use a film in which two perforations are provided per frame.

13. An apparatus comprising:

a) a film transport device which transports a film;

b) a position detection device which detects a position of the film transported by the transport device in a stopped state;

c) a determination device which determines whether the position of the film frame detected by said detection device is at a photo-taking position or is deviated from the photo-taking position; and d) a control device which controls said film transport device to perform a predetermined operation when said position of the film is determined to be not positioned at the photo-taking position by the determination device.

14. An apparatus according to claim 13, wherein said apparatus includes a camera.

* * * * *

UNITED STATES PATENT AND TRADEMARK OFFICE
CERTIFICATE OF CORRECTION

PATENT NO. : 6,269,224 B1
DATED : July 31, 2001
INVENTOR(S) : Hajime Watanabe

Page 1 of 1

It is certified that error appears in the above-identified patent and that said Letters Patent is hereby corrected as shown below:

<u>Column 3,</u>
Line 1, delete "uperferated" and insert -- unperforated --.

Signed and Sealed this

Twenty-sixth Day of March, 2002

Attest:

JAMES E. ROGAN
*Attesting Officer*     *Director of the United States Patent and Trademark Office*